US006454285B1

(12) United States Patent
Koenig

(10) Patent No.: US 6,454,285 B1
(45) Date of Patent: Sep. 24, 2002

(54) ERGONOMIC WHEELCHAIR WITH PATIENT LIFTING MECHANISM

(76) Inventor: Larry Koenig, Box 1037, Williamsburg, IA (US) 52361

( * ) Notice: Subject to any disclaimer, the term of this patent is extended or adjusted under 35 U.S.C. 154(b) by 29 days.

(21) Appl. No.: 09/595,530

(22) Filed: Jun. 16, 2000

Related U.S. Application Data

(60) Provisional application No. 60/191,081, filed on Mar. 21, 2000.

(51) Int. Cl.[7] .................................. B62M 1/14

(52) U.S. Cl. .................... 280/250.1; 280/43.24; 188/2 F; 188/5

(58) Field of Search .................... 280/250.1, 304.1, 280/43, 43.14, 43.17, 43.24, 47.38, 47.41, 79.2; 297/DIG. 4, DIG. 10; 188/5, 2 F

(56) References Cited

U.S. PATENT DOCUMENTS

| | | | | | |
|---|---|---|---|---|---|
| 2,035,294 | A | | 3/1936 | Black | |
| 2,897,910 | A | * | 8/1959 | Steely et al. | 188/5 |
| 3,566,994 | A | * | 3/1971 | Isaacs | 188/5 |
| 4,569,556 | A | * | 2/1986 | Pilot | 297/DIG. 10 |
| 4,598,944 | A | * | 7/1986 | Meyer et al. | 297/DIG. 10 |
| 4,614,246 | A | * | 9/1986 | Masse et al. | 297/DIG. 4 |
| 4,679,849 | A | * | 7/1987 | Torgny | 280/250.1 |
| 4,862,997 | A | | 9/1989 | Eberle | |
| 5,160,182 | A | | 11/1992 | Chang | |
| 5,431,254 | A | * | 7/1995 | Kramer et al. | 280/43.24 |
| 5,458,349 | A | * | 10/1995 | Mung-Tung | 280/250.1 |
| 5,542,740 | A | | 8/1996 | Chang | |
| 5,568,933 | A | * | 10/1996 | Mizuno | 280/250.1 |
| 5,669,659 | A | | 9/1997 | Dittmer | |
| 5,899,467 | A | | 5/1999 | Henkel | |
| 5,984,338 | A | * | 11/1999 | Meyer | 280/304.1 |

* cited by examiner

*Primary Examiner*—Frank Vanaman
(74) *Attorney, Agent, or Firm*—Allan L. Harms

(57) ABSTRACT

A wheelchair for use in care facilities includes a seat lift mechanism and a chair tilt mechanism both of which are actuated by a single lever. Operation of the lever elevates the rear of the seat and raises the rear of the wheelchair thereby moving the wheelchair occupant toward a standing position and reduces the lifting effort of the attendant in assisting the debilitated patient to move out of the wheelchair.

19 Claims, 10 Drawing Sheets

ERGONOMIC WHEELCHAIR WITH PATIENT LIFTING MECHANISM

CROSS REFERENCE TO CO-PENDING PROVISIONAL APPLICATION

This application [is converted from] claims the benefit under 35 U.S.C. §119(e) and 37 C.F.R. §1.78 of copending provisional patent application entitled "Ergonomic Wheelchair with Patient Lifting Mechanism", Ser. No. 60/191,081 filed Mar. 21, 2000.[, from which this application claims priority.]

BACKGROUND OF THE INVENTION

Wheelchairs are used to move patients within hospitals and nursing homes. Current wheelchairs are constructed with a seat and seat back supported on a rectangular frame with large rear wheels and small front wheels which may swivel. Typically a brake mechanism is employed with each back wheel to prevent its rotation when the patient is to be removed from the wheelchair. When a patient who is seated in a wheelchair is to be moved to a stationary chair or a bed, an attendant must stand in front of the patient to lift the patient to assist the patient in leaving the wheelchair. The attendant must reach forward and grasp the arms or body of the patient to lift the patient from the wheelchair even when the patient can assist by standing. The lifting activity must be performed while the attendant is in a weakened position, leaning forward and bending down, and this frequently contributes to back injuries of the attendant.

SUMMARY OF THE INVENTION

The present invention is an improved wheelchair for transporting patients, especially elderly and feeble patients living in nursing homes where movement of patients to and from wheelchairs is a frequent occurrence. The improved wheelchair of the present invention provides an ergonomic improvement in the job responsibilities of the attendant who must assist the debilitated patient in moving from the wheelchair to another position. Hence it is an object of the invention to provide a wheelchair which reduces the risk of back injury to the attendant assisting the patient in leaving the wheelchair.

The wheelchair is provided with a main frame supported on four generally equally sized wheels, the rear two of which are pivotable on a vertical axis in the typical fashion. A seat supporting frame on which the seat of the wheelchair is supported is carried within the main frame. The seat supporting frame is hinged along its front-to-back length such that the rear end of the seat can be raised when the patient is to exit the wheelchair. As the rear end of the seat rises, the front end of the seat lowers. This operation is effected by use of an operating lever which turns a transverse bar to which a seatlift lever is radially attached. The seatlift lever is connected to a link which forces the rear of the wheelchair seat upward. A lifting mechanism which raises the rear of the wheelchair frame is also operable when the operating lever is actuated. This lifting mechanism causes a foot to be lowered below the rear of the wheelchair frame and forced against the floor surface on which the wheelchair is stationed. This operation also causes the rear wheels of the wheelchair to be lifted off the floor surface, thereby also elevating the patient's body within the wheelchair while immobilizing the wheelchair. The foot is fixed to the lower end of a generally vertical stake which is guided by a bushing it passes through, the bushing being held stationary relative to the chair by its mounting to a cross bar mounted at its ends to the wheelchair's main frame. The stake is forced downward by a linking arm which rotates with the rotatable transverse bar to which the operating lever is fixed. Hence, pulling the operating lever toward the front of the wheelchair causes the rear of the wheelchair frame to elevate off the floor surface while also causing the seat to tilt forward thereby assisting the patient toward a standing position. With the patient partly elevated, an attendant need not stoop forward to help in lifting and guiding the patient from the wheelchair.

In an alternate embodiment, the wheelchair may include a rider operated lever so that the occupant of the chair can activate the lift mechanism. In another embodiment, the lift mechanism may be operated by a person behind the chair by use of a rearward moving lever.

It is an object of the invention to provide an improved wheelchair which selectively lifts a patient seated in the wheelchair part way to a standing position.

It is another object of the invention to provide a wheelchair which may be immobilized while a patient is being removed from the chair.

It is further an object of the invention to provide an improved wheelchair which reduces the risk of back injury to an attendant assisting a patient in exiting the wheelchair.

These and other objects will be better understood from examination of the detailed description which follows.

DESCRIPTION OF THE DRAWING FIGURES

DETAILED DESCRIPTION OF THE INVENTION

Figure 1:
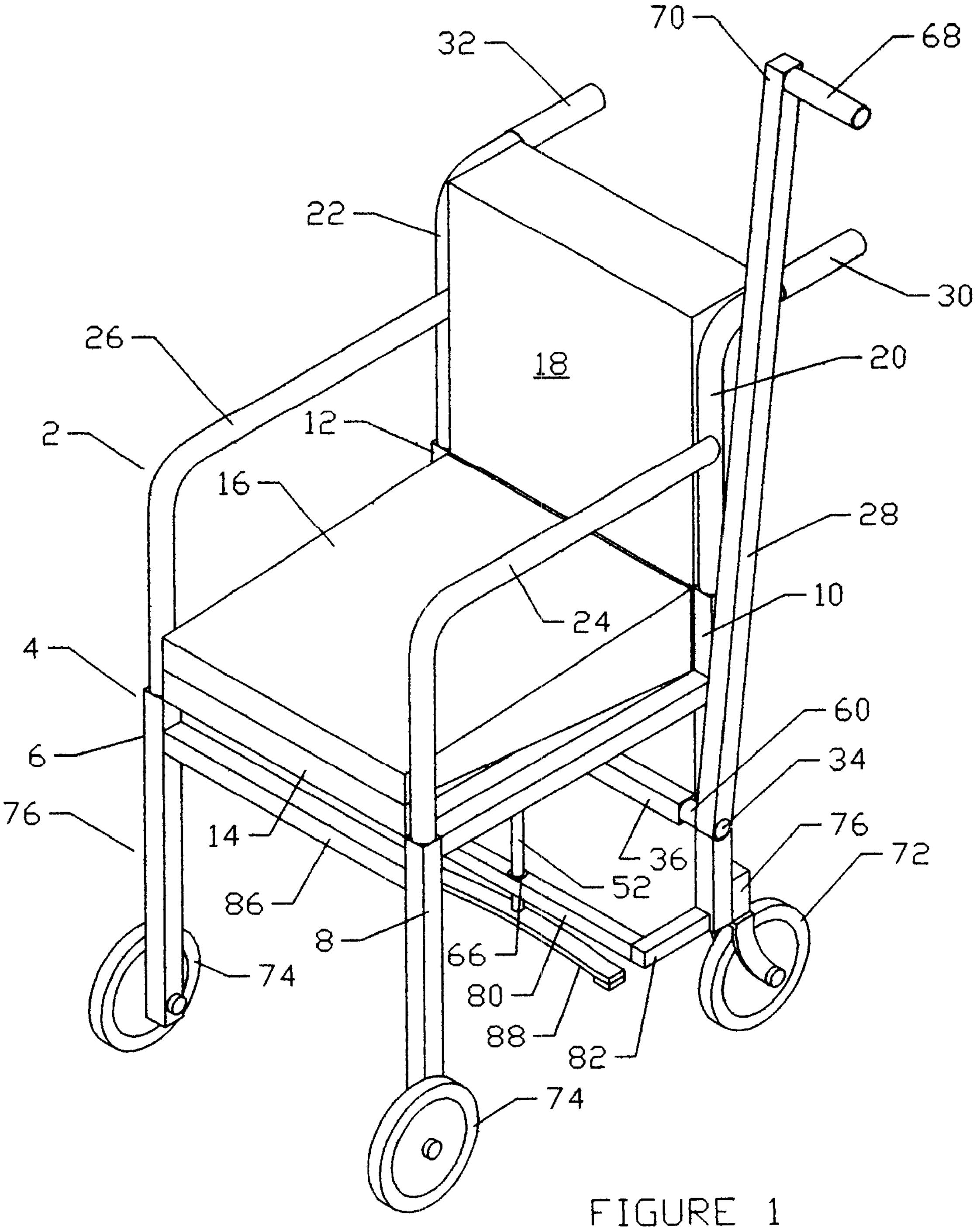
FIG. 1 is a front right perspective of a wheelchair according to the present invention.
Figure 2:
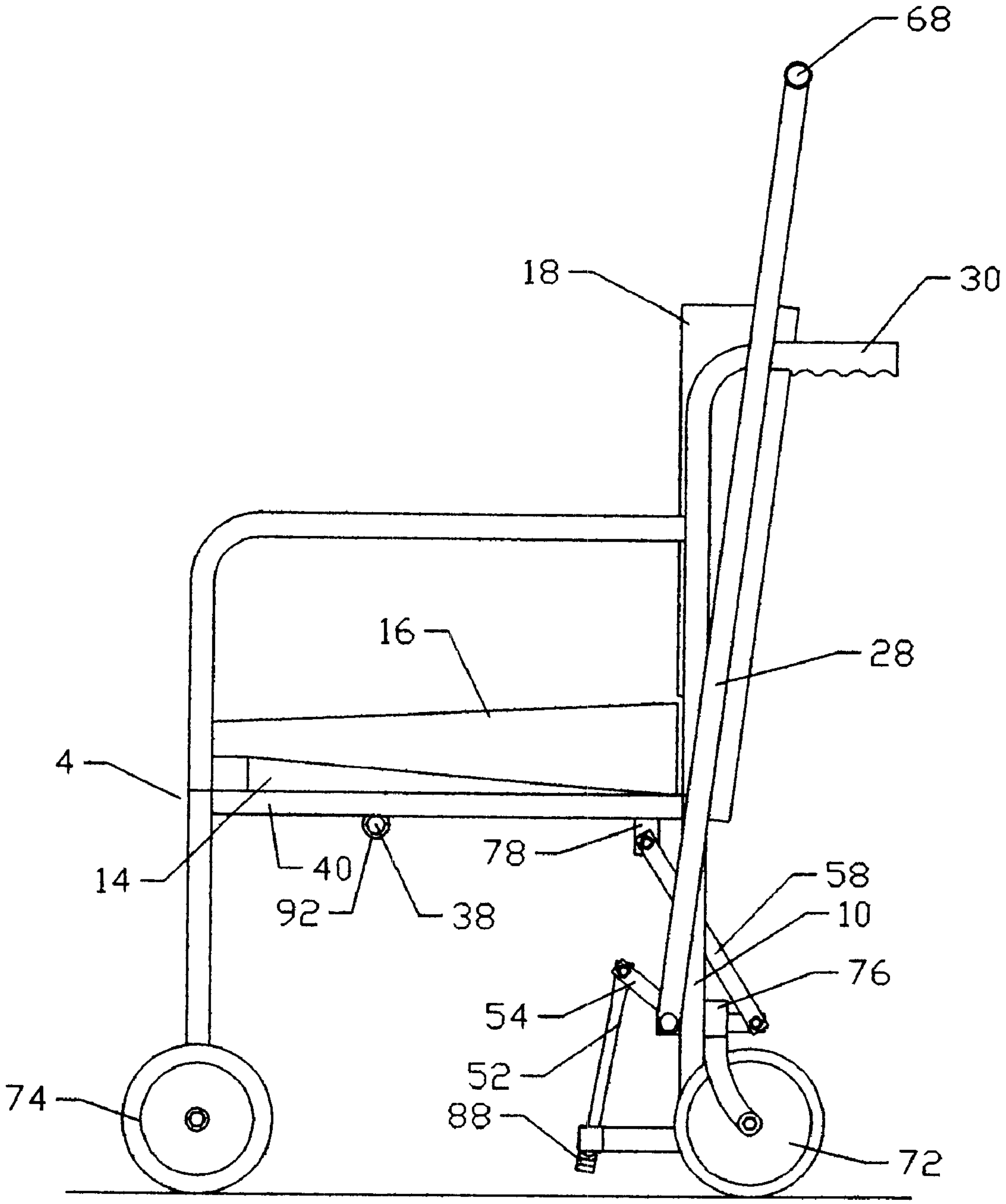
FIG. 2 is a side elevation of the wheelchair of FIG. 1 in its travel position.
Figure 3:
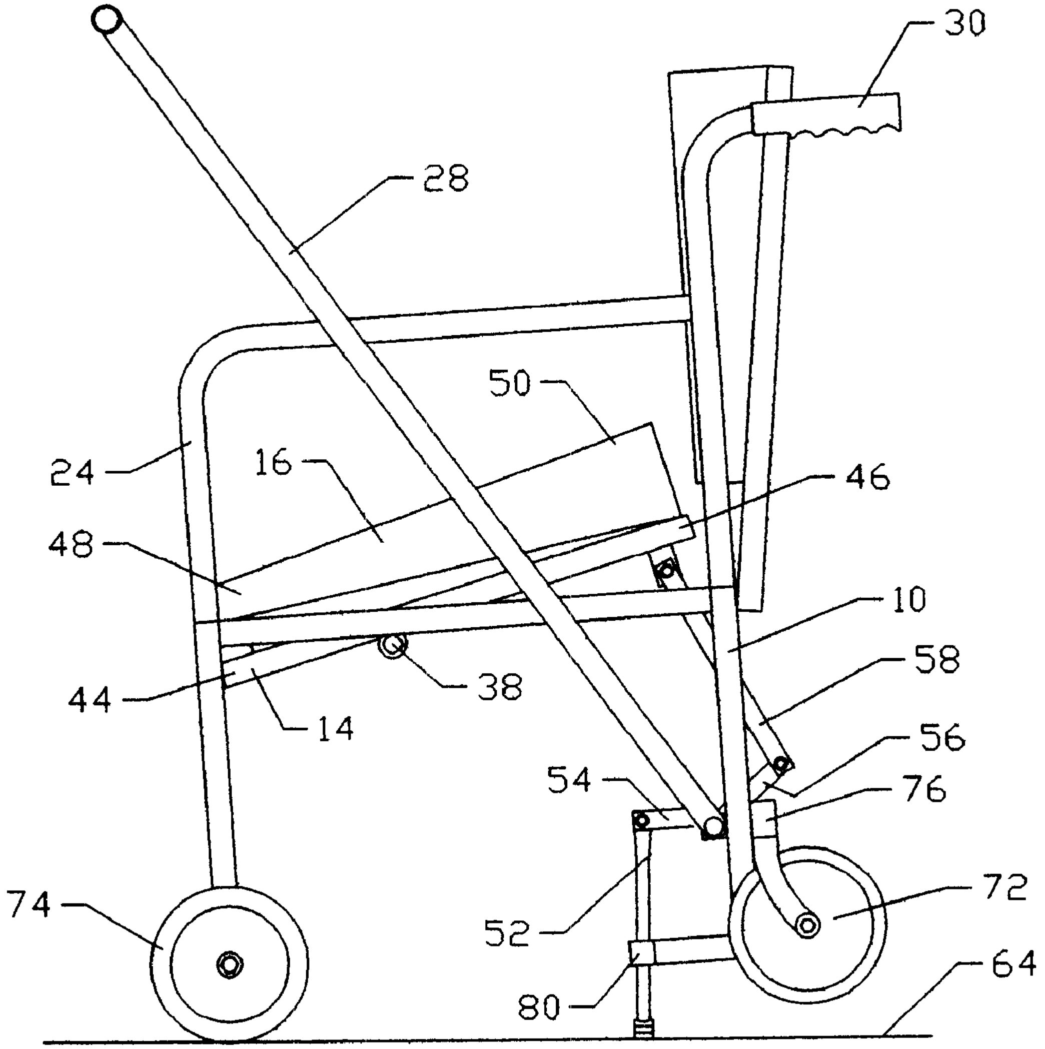
FIG. 3 is a side elevation of the wheelchair of FIG. 1 in its elevated position.
Figure 4:
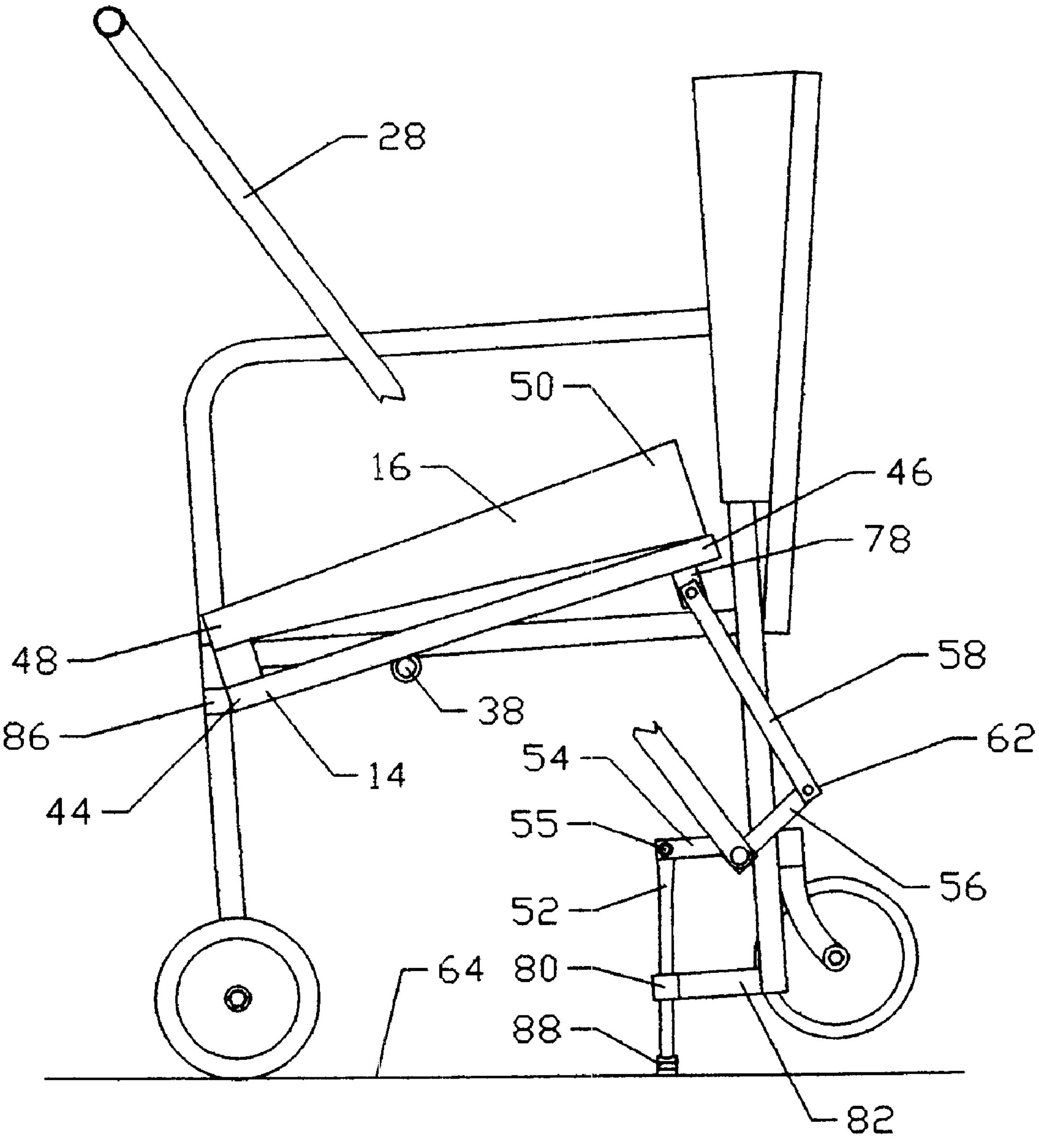
FIG. 4 is a side elevation of the wheelchair invention in its elevated position with the left frame components removed and with the activation lever partly cut away.
Figure 5:
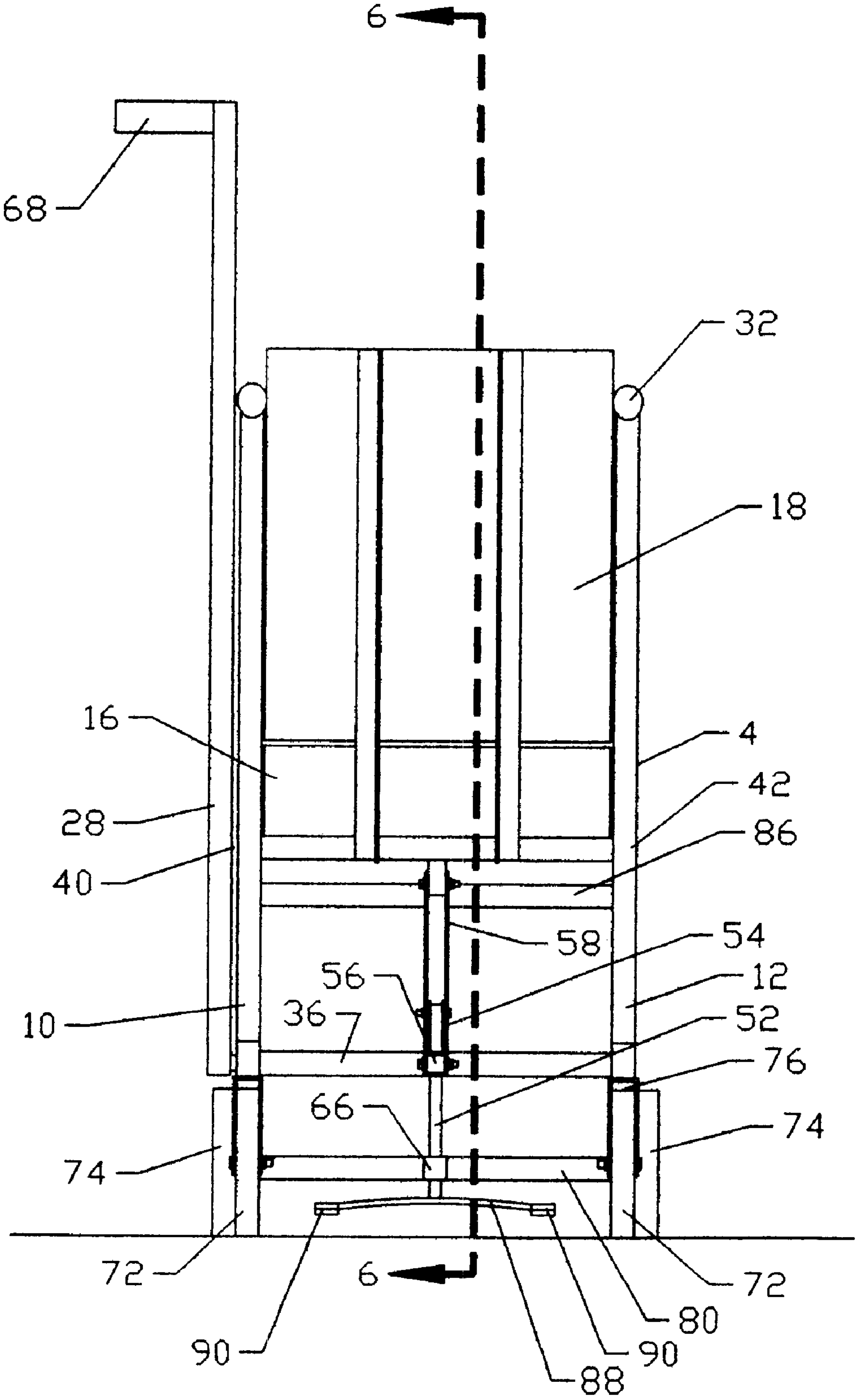
FIG. 5 is a rear view of the wheelchair in its travel position.
Figure 6:
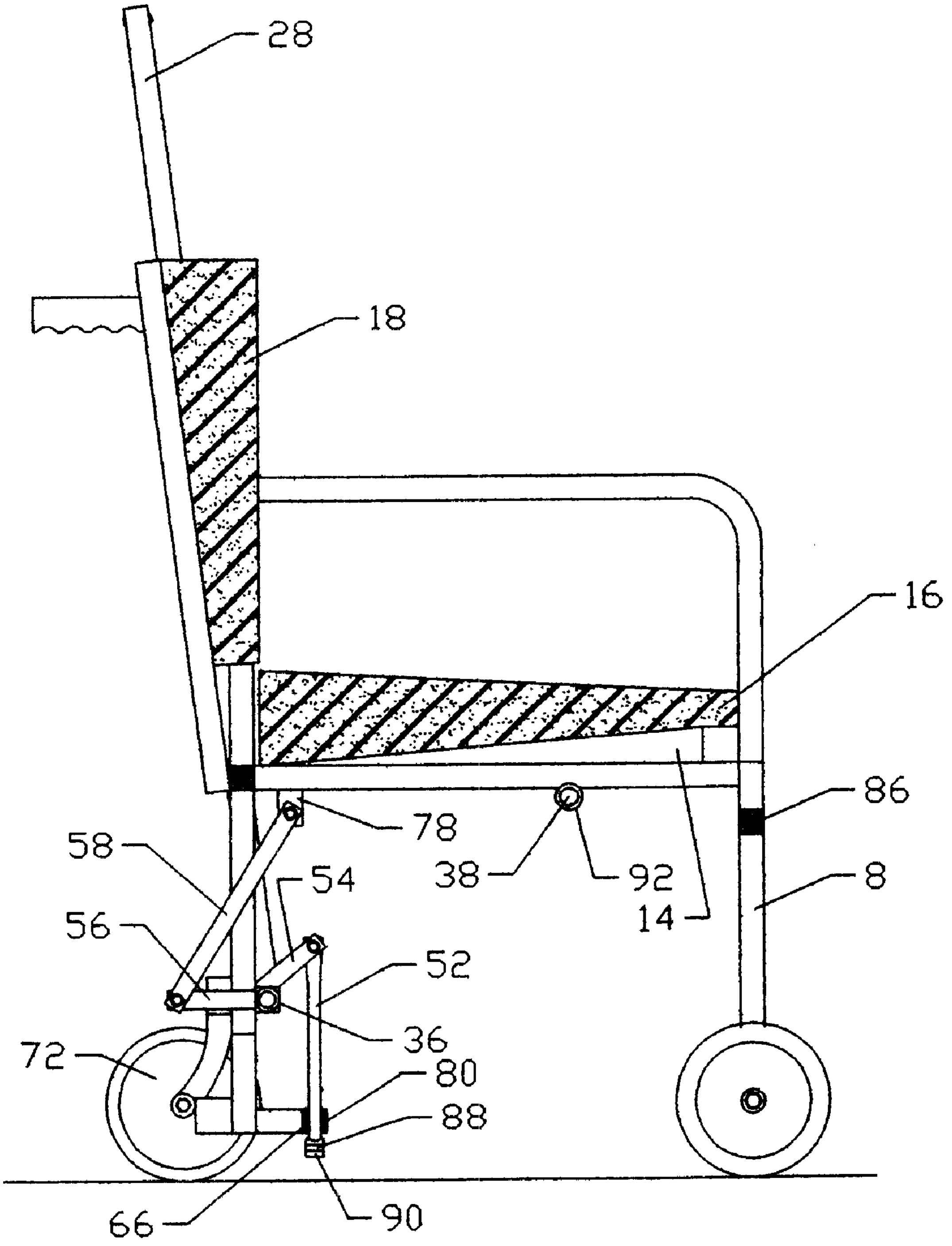
FIG. 6 is a section view along line 6—6 of FIG. 5.

This invention is a wheelchair for transporting persons around residential care facilities for the elderly and disabled. Like elements are identified by identical reference characters throughout the drawing figures.

FIG. 1 depicts a front right perspective of the invention wheelchair 2 in its travel position wherein a person who may be seated in the wheelchair 2 may be moved from one location to another. Wheelchair 2 is provided with a main frame 4 including vertical legs 6, 8, 10, 12 at each of the corners of main frame 4. The main frame 4 supports a pivotable seat frame 14 therewithin, the seat frame 14 having a seat 16 mounted thereupon. A horizontal strut 86 interconnects front legs 6 and 8 and is disposed spaced apart from and below seat frame 14. A backrest 18 is mounted to the upper ends 20, 22 respectively of rear legs 10, 12. Arm rests 24, 26 may extend from upper ends 20, 22 to provide lateral arm support for a patient seated in wheelchair 2. Handles 30, 32 extend rearwardly from upper ends 20, 22 of rear legs 10, 12 respectively, to provide grips for an attendant to push the wheelchair 2 and guide it as desired. The wheelchair 2 is supported by paired rear wheels 72 and front wheels 74. Rear wheels 72 are mounted by stem housings 76 fixed to the rear of rear legs 10, 12 such that each of rear wheels 72 may freely rotate about a vertical axis defined by the stem housings 76. Each of front wheels 74 is mounted to one of front legs 6, 8 but front wheels 74 do not swivel about a vertical axis. An elongate lever 28 having a lower end 34 is mounted at its lower end 34 to transverse bar 36 which extends laterally below seat 16 immediately in front of rear legs 10 and 12. Lever 28 is provided with grip handle 68 at its upper free end 70. Transverse bar 36 is rotatable about its axis and is retained to rear legs 10, 12 by bearing housings 60 into which the opposing ends of transverse bar 36 are journaled. Transverse bar 36 is fixed to lower end 34 of lever 28 such that rotation of lever 28 about its lower end 34 will cause axial rotation of transverse bar 36.

Referring now to FIGS. 2–6, other details of the structure of wheelchair 2 may be visualized. Seat frame 14 is pivotable upon main frame 4 about a pair of hinge pins 38 which are journaled by bushings 92 to the undersides of opposing sides 40, 42 of main frame 4. Each hinge pin 38 is oriented with its axis horizontal. Because of the pivotal mounting of seat frame 14 to main frame 4 at a point between the front end 44 and rear end 46 of seat frame 14, but not necessarily midway therealong, the front 48 of seat 16 may decline while the rear 50 thereof rises. Hinge pins 38 are disposed about thirty to forty percent, preferably approximately thirty-five percent, of the distance from front end 44 to rear end 46 of seat frame 14. Pivot of seat frame 14 is accomplished by operation of lever 28, which also causes downward movement of stake 52 which engages the floor surface 64 to elevate the rear legs 10, 12 of wheelchair 2. Specifically, as lever 28 is moved forward from its substantially upright rest position, transverse bar 36 rotates about its axis, causing rotation of stake arm 54 and of seatlift lever 56, each of which is radially fixed to transverse bar 36. The angular displacement of seatlift lever 56 causes upward movement of link arm 58 which interconnects bracket 78 on seat frame 14 and the free end 62 of seatlift lever 56. As transverse bar 36 is rotated, stake arm 54 rotates counterclockwise forcing stake 52 downward causing foot 88 thereof to come into touching engagement with the floor surface 64 under the wheelchair 2. Foot 88 is elongate laterally and is provided with skid-resistent pads 90 on the underside of the ends thereof. Cross bar 80 is supported on lateral arms 82, 84 extending a few inches forward of rear legs 10, 12 respectively and is disposed generally in parallel to transverse bar 36 and generally vertically aligned with free end 55 of stake arm 54 when stake arm 54 is horizontally oriented. Stake 52 is guided through bearing tube 66 mounted along cross bar 80. As stake 52 is forced downward through bearing tube 66 of cross arm 80, front wheels 74 and rear legs 10, 12 are elevated, thus raising the rear of main frame 4 of wheelchair 2.

Figure 7:
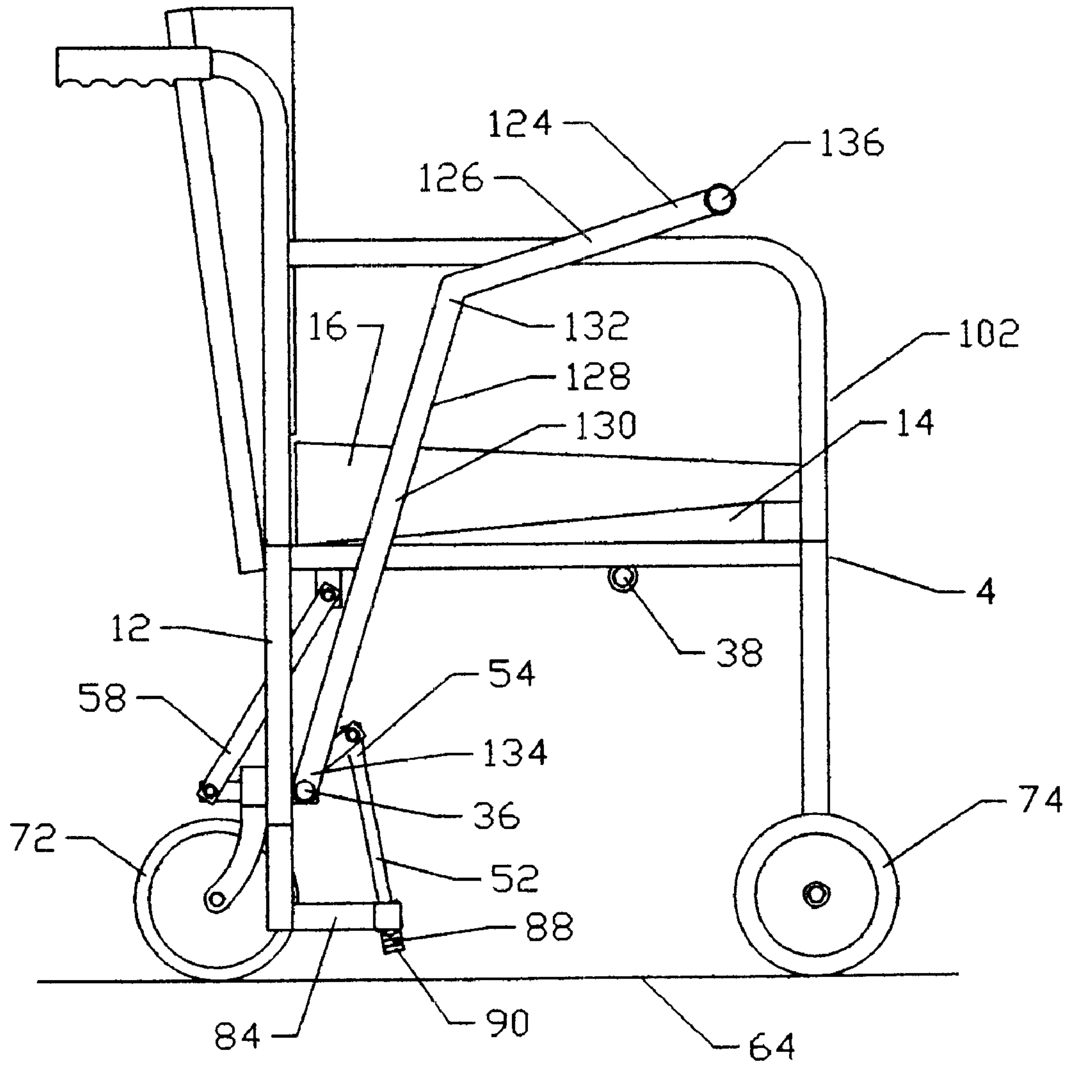
FIG. 7 is a side elevation of an alternative embodiment wheelchair provided with a rider-operable lever.

Illustrated in FIG. 7 is an alternative embodiment of the invention wherein wheelchair 102 is equipped with rider-operable lever 128 which may be provided on each side of main frame 4, such that a rider seated in wheelchair 102 may self operate the lifting mechanism as described in reference to FIGS. 1–6. Rider-operable lever 128 is fixed at its lower end 134 to transverse bar 36 such that forward and downward movement of rider-operable lever 128 will cause axial rotation of transverse bar 36 thereby causing link 58 to urge seat frame 14 to rotate about hinge pins 38. Because stake arm 54 is radially fixed to transverse bar 36, stake arm 54 also rotates about the axis of transverse bar 36 and urges stake 52 downward into abutting engagement with floor surface 64, thereby raising rear wheels 72 above floor surface 64 while front wheels 74 remains resting on floor surface 64. Rider-operable lever 128 includes a first segment 130 which includes lower end 134 which is fixed to transverse bar 36. Mounted angularly to the upper end 132 of first segment 130 is second segment 126 which may be provided with a transverse hand grip 136 at its free end 124. Second segment 126 is disposed generally parallel to arm rest 26 when wheelchair 102 is in its travel position. A rider seated in wheelchair 102 may grasp hand grip 136 or second segment 126 of rider-operable lever 128 to urge it downward, thereby raising rear legs 10, 12 as well as the rear 50 of seat 16 to assist the rider to achieve a standing position. Rider-operable levers 128 may be provided on both sides of main frame 4 such that the rider may use both arms to raise seat 16 and to elevate rear legs 10, 12. The skid-resistent pads 90 of foot 88 touchingly engage the floor surface 64 when second segments 126 of rider-operated levers 128 are urged downward, thereby stabilizing wheelchair 102 and resisting forward movement thereof.

Figure 8:
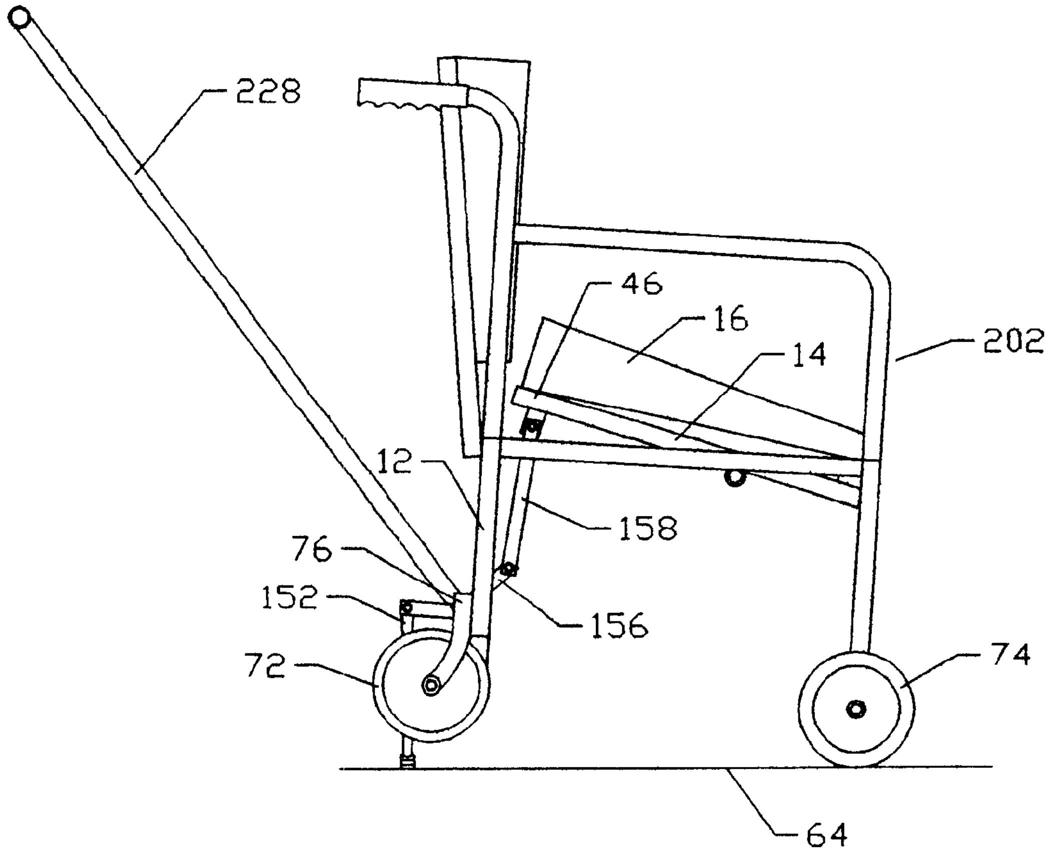
FIG. 8 is a side elevation of another alternative embodiment wheelchair provided with an attendant-operable lever which may be operated from behind the wheelchair, the wheelchair shown in its elevated position.
Figure 9:
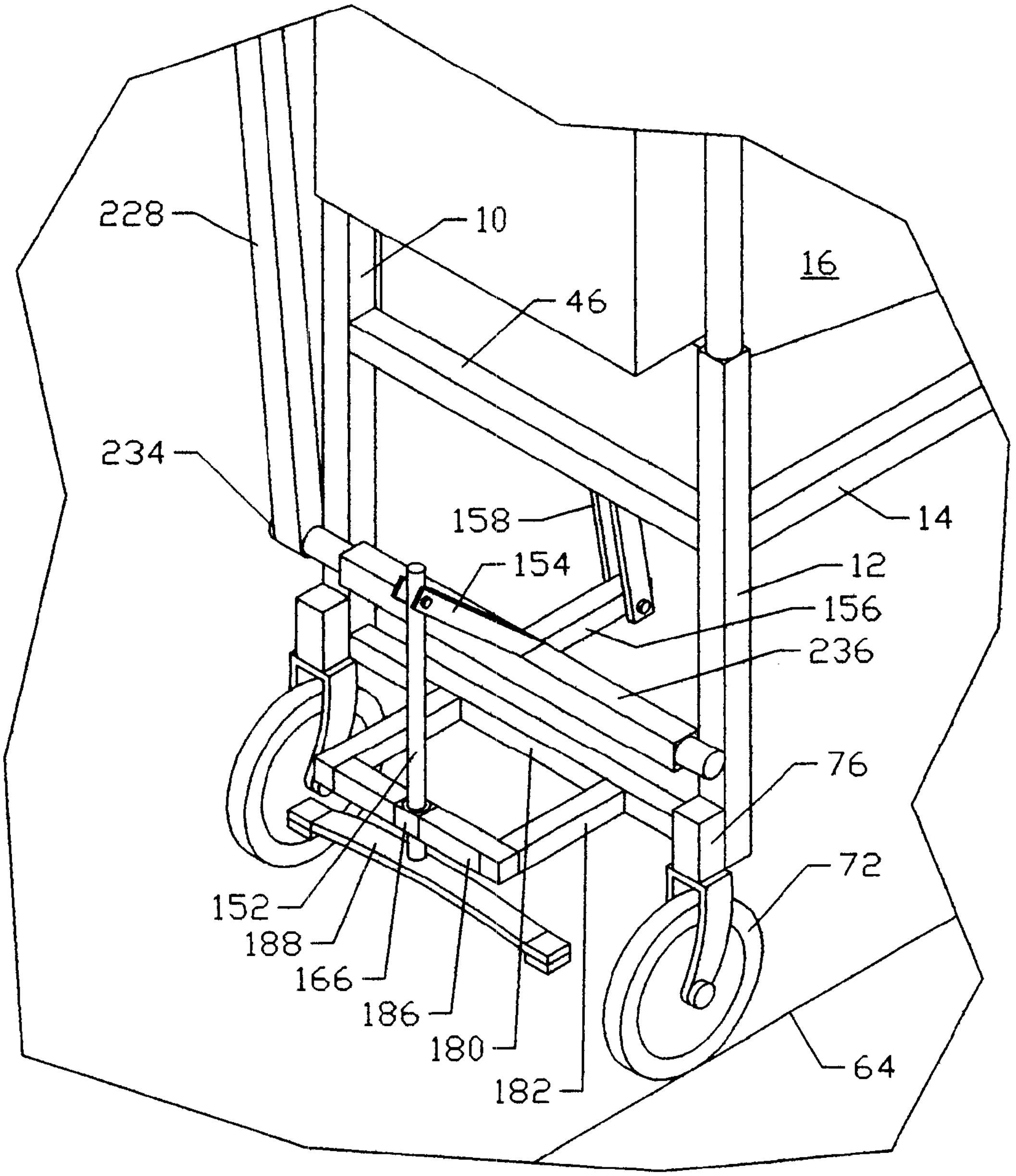
FIG. 9 is an enlarged perspective view of the elevating linkage of the alternate embodiment wheelchair of FIG. 8.

FIGS. 8 and 9 depict another alternative embodiment wheelchair 202 provided with an attendant-operable lever 228 which may be operated from behind the wheelchair 202. In this embodiment, wheelchair 202 is provided with elements identical to those of the wheelchair 2 of FIGS. 1–6 except the linkage members which elevate the rear of wheelchair 202 and the rear end 46 of seat frame 14 thereof are arranged such that rotation of attendant-operable lever 228 toward the rear of wheelchair 202 causes elevation. A transaxle 236 is journaled to the rear legs 10, 12 of wheelchair 202. Attendant-operable lever 228 is fixed at its lower end 234 to transaxle 236 such that transaxle 236 axially rotates as attendant-operable lever 228 pivots rearwardly about its lower end 234. Seatlift lever 156 and stake arm 154 extend from transaxle 236 and are fixed thereto, radiating outward in substantially opposing directions. As transaxle 236 rotates, seat lift lever 156 urges link 158 upward. Because link 158 is hingedly joined to the underside of seat frame 14, the rear end 46 of seat frame 14 will rise. As seat lift lever 156 moves, stake arm 154 also rotates, urging stake 152 downward through guide bushing 166. Guide bushing 166 is housed along cross piece 186 of guide frame 182 which is supported by its mounting to cross strut 180 which is fixed at its ends to rear legs 10 and 12. Guide frame 182 guides stake 152 as it moves toward floor surface 64. The lower end of stake 152 is provided with foot 188 which touchingly engages floor surface 64 when attendant-operable lever 228 is urged rearward, thereby raising rear wheels 72 above floor surface 64 while rear end 46 of seat frame 14 and hence seat 16 is elevated.

Figure 10:
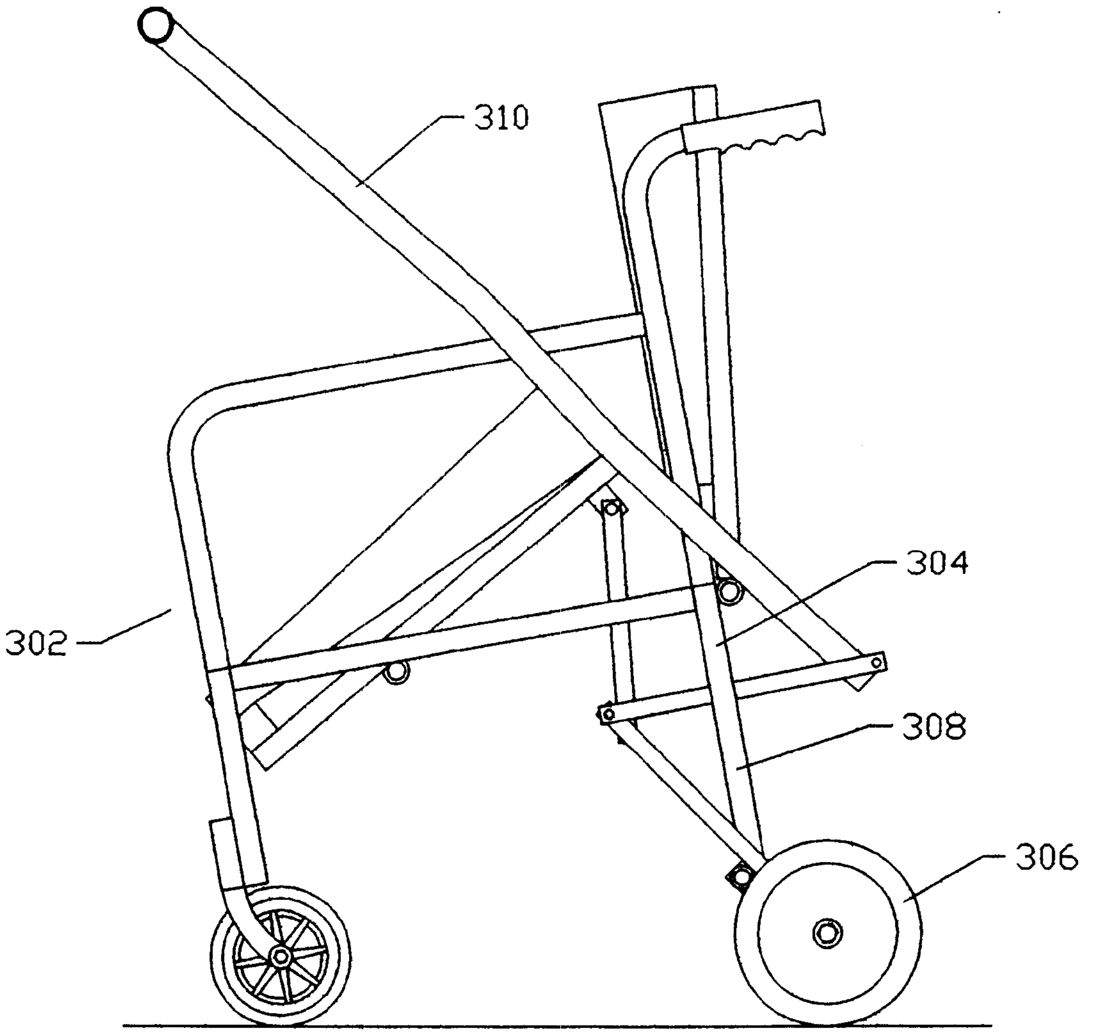
FIG. 10 is a side elevation of a third alternate embodiment wheelchair shown in its elevated position with the rear wheels rotated forward from their travel position behind the rear legs of the wheelchair frame.

It is to be understood that many alternate mechanical linkages may be devised to cause the rear of frame 4 to be lifted while pivoting the front of seat 16 downward while also stabilizing the wheelchair upon floor surface 64. For instance, FIG. 10 illustrates another alternative embodiment wheelchair 302 which operates to raise the rear 304 of the wheelchair 302 by rotating the rear wheels 306 forward and under the rear lets 308 of the wheelchair 302 when lever 310 is moved forward.

OPERATION

With a patient seated on seat 16 of wheelchair 2 with lever 28 in its relaxed, substantially upright position, the wheelchair 2 may be moved from place to place on its wheels 72, 74. Once the patient's destination has been reached, an attendant may pull lever 28 toward the front of wheelchair 2 thereby elevating the rear of wheelchair 2 as well as rotating seat 16 such that front end 44 of seat frame 14 declines and rear end 46 thereof rises, to facilitate the movement of the patient from wheelchair 2 to a standing position. The attendant is thereby relieved of the need to reach substantially forward to grasp the patient's limbs or body to assist in bringing the patient to his or her feet and hence the risk of back strain to the attendant is substantially reduced.

Having described the invention, I claim:

1. A wheelchair for transport of a person over a floor surface comprising a generally rectangular main frame having a front and a rear, said front of said main frame supported on two front legs, said rear of said main frame supported on two rear legs, each of said front legs supported by a front wheel, each of said rear legs supported by a rear wheel, said main frame having a seat frame supported therewithin, the seat frame having a front and a rear corresponding to said front and said rear of said main frame, a seat supported upon said seat frame, said seat frame selectively pivotable upon said main frame to pivot about a generally horizontal axis, a transverse bar journaled to said rear legs and selectively axially rotatable thereupon, a first link fixed generally perpendicularly to said transverse bar, a second link hingedly joined to said first link, said second link interconnecting said seat to said first link, a lever joined to said transverse bar operable to selectively rotate said transverse bar whereby operation of said lever elevates said rear of said seat frame.

2. The wheelchair of claim 1 wherein an arm extends generally perpendicularly from said transverse bar, an elongate member hinged to said arm and moveable generally vertically when said transverse bar is rotated, said elongate member engages said floor surface to raise said rear of said frame when said lever is operated and said rear of said seat frame is elevated.

3. The wheelchair of claim 2 wherein said horizontal axis of pivot of said seat frame is disposed between said rear and said front of said seat frame.

4. The wheelchair of claim 3 wherein said rear legs each have a lower portion, said transverse bar journaled to said lower portion of each of said rear legs, said transverse bar oriented substantially horizontally, said lever generally perpendicular to said transverse bar, said lever oriented generally vertically when said rear of said seat frame is not elevated.

5. The wheelchair of claim 4 wherein said elongate member comprises a stake depending from said arm, a guide member disposed in intersection with said stake, said guide member comprising a hollow bearing element through which said stake is axially moveable.

6. The wheelchair of claim 5 wherein said stake includes a lower end thereon, a generally horizontally disposed elongate foot member fixed to said lower end of said stake.

7. The wheelchair of claim 6 wherein said rear wheels and said front wheels are of generally similar diameter, each of said rear wheels may freely swivel about a substantially vertical axis, said arm extends from said transverse bar toward said front of said main frame, said first link extends from said transverse bar toward said front of said main frame, said lever is operable from a substantially upright position to an angular position directed toward said front of said main frame.

8. The wheelchair of claim 7 wherein said wheelchair has a travel position and a patient discharge position, said lever being generally upright, said seat frame being generally horizontal and said rear wheels supported on said floor surface when said wheelchair is in said travel position, said rear of said seat frame elevated above said front thereof and said rear wheels raised above said floor surface when said lever is displaced toward said front of said main frame when said wheelchair is in said patient discharge position.

9. The wheelchair of claim 1 wherein said rear legs each have a lower portion, said transverse bar journaled to said lower portions of each of said rear legs, said transverse bar oriented substantially horizontally, said lever generally perpendicular to said transverse bar, said lever being elongate and comprising a lower portion and an upper portion, said upper portion joined to said lower portion at a substantial angle, said upper portion disposed generally along said seat when said seat is in a generally horizontal position, whereby a person seated in said wheelchair may grasp said upper portion and urge it downward to elevate said rear of said seat frame and said rear of said main frame.

10. The wheelchair of claim 9 wherein a second lever is fixed perpendicularly to said transverse bar and is operable therewith, each of said lever and said second lever is fixed to an opposing end of said transverse bar, said second lever being generally identical to said lever and comprising a lower portion and an upper portion, said upper portion of said second lever disposed generally beside said seat opposing said upper portion of said lever when said seat is in a generally horizontal position, whereby a person seated in said wheelchair may grasp said upper portion of each of said lever and said second lever and urge them downward to elevate said rear of said seat frame and said rear of said main frame.

11. The wheelchair of claim 9 wherein an arm extends generally perpendicularly from said transverse bar, an elongate member hinged to said arm and moveable generally vertically when said transverse bar is rotated, said elongate member engages said floor surface to raise said rear of said frame when said lever is operated and said rear of said seat frame is elevated.

12. The wheelchair of claim 1 wherein said rear legs each have a lower portion, said transverse bar journaled to said lower portions of each of said rear legs, said transverse bar oriented substantially horizontally, said lever generally perpendicular to said transverse bar, said arm extends from said transverse bar away from said front of said main frame, said elongate member comprises a stake depending from said arm, a guide member disposed in intersection with said stake, said guide member extending behind said rear legs, said lever operable from a generally upright position to a position away from the rear of said front of said main frame whereby an attendant positioned behind said wheelchair may operate said lever to rotate said transverse bar and thereby to elevate said rear of said frame and said rear of said seat frame.

13. The wheelchair of claim 12 wherein an arm extends generally perpendicularly from said transverse bar, an elongate member hinged to said arm and moveable generally vertically when said transverse bar is rotated, said elongate member engages said floor surface to raise said rear of said frame when said lever is operated and said rear of said seat frame is elevated.

14. The wheelchair of claim 1 wherein said horizontal axis of pivot of said seat frame spaced apart substantially from said rear and said front of said seat frame, said rear legs each have a lower portion, said transverse bar journaled to said lower portions of each of said rear legs, said transverse bar oriented substantially horizontally, said lever generally perpendicular to said transverse bar, said lever oriented generally vertically when said rear of said seat frame is not elevated, said rear wheels and said front wheels are of generally similar diameter, each of said rear wheels may freely swivel about a substantially vertical axis, said lever is operable from a substantially upright position to an angular position directed toward said front of said main frame.

15. The wheelchair of claim 14 wherein said lever being elongate and comprising a lower portion and an upper portion, said upper portion joined to said lower portion at a substantial angle, said upper portion disposed generally along said seat when said seat is in a generally horizontal position, whereby a person seated in said wheelchair may grasp said upper portion and urge it downward to elevate said rear of said seat frame and said rear of said main frame.

16. The wheelchair of claim 14 wherein said arm extends from said transverse bar away from said front of said main frame, said elongate member comprises a stake depending from said arm, a guide member disposed in intersection with said stake, said guide member extending behind said rear legs, said lever operable from a generally upright position to a position away from the rear of said front of said main frame whereby an attendant positioned behind said wheelchair may operate said lever to rotate said transverse bar and thereby to elevate said rear of said frame and said rear of said seat frame.

17. An improved wheelchair for use in a patient care institution to transport patients over a floor surface comprising a chair comprising a frame with a seat mounted therein, the frame comprising rear legs and front legs, each of the legs supported by a wheel, the frame having a rear end, the seat having a front and a rear, said seat pivotably mounted to said frame to rotate about a horizontal axis such that said rear of said seat may be selectively elevated, said rear of said frame selectively elevatable, said rear end of said frame elevating as said seat is rotated about the horizontal axis, whereby the wheels of the rear legs rise from the floor surface as said seat rotates about the horizontal axis.

18. The improved wheelchair of claim 17 wherein the horizontal axis disposed generally midway between the front and the rear of the seat, whereby the front of the seat declines as the rear of the seat elevates.

19. A wheelchair for movement of a person over a floor surface comprising a generally rectangular main frame having a front and a rear, said front of said main frame supported on two front legs, said rear of said main frame supported on two rear legs, each of said front legs supported by a front wheel, each of said rear legs supported by a rear wheel, said main frame having a seat frame supported therewithin, a seat supported upon said seat frame, the seat frame has a front and a rear, the seat frame rotatable upon said main frame about a horizontal axis, the horizontal axis disposed between the front and the rear of the seat frame, a transverse bar journaled to said rear legs and selectively axially rotatable thereupon, an arm extends generally perpendicularly from said transverse bar, an elongate member hinged to said arm and moveable generally vertically when said transverse bar is rotated, a lever joined to said transverse bar operable to rotate said transverse bar, said elongate member touchingly engaging said floor surface when said lever is operated whereby operation of said lever elevates both rear wheels above the floor surface, the rear of the seat frame coupled to the lever, the seat frame rotating about said horizontal axis as the rear wheels rise above the floor surface.

* * * * *